Aug. 18, 1953  A. B. HULSE  2,648,903
MECHANICAL MOVEMENT
Filed Nov. 25, 1950
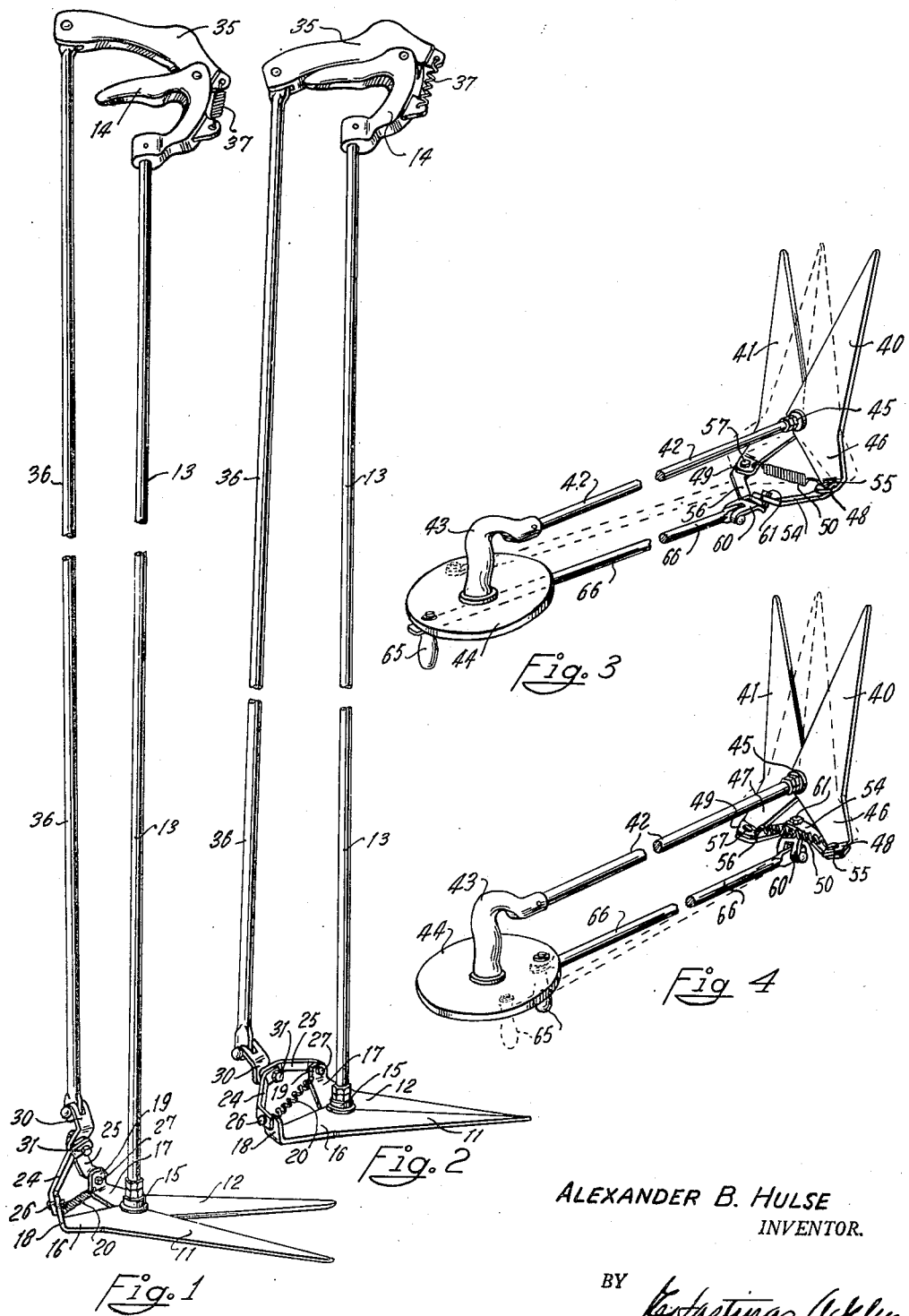
ALEXANDER B. HULSE
INVENTOR.
BY
ATTORNEY Patented Aug. 18, 1953

2,648,903

UNITED STATES PATENT OFFICE 2,648,903

MECHANICAL MOVEMENT

Alexander B. Hulse, Dallas, Tex.

Application November 25, 1950, Serial No. 197,555

7 Claims. (Cl. 30—248)

1

This invention relates to new and useful mechanical movements of a type including toggle mechanism and is capable of general application in various arts.

The invention aims to provide an improved toggle mechanism of a type wherein the actuating force is applied at an angle to the plane of movement of the parts to be operated by the toggle mechanism.

It is a further object of the invention to provide a toggle mechanism wherein the actuating force is applied at an angle to the plane of movement of the parts to be operated thereby and wherein the pivotal connections of the various links of the mechanism are so arranged that there is no binding of the moving parts during operation.

Another object is to provide an operating mechanism wherein the force applied increases as the work resistance increases and such applied force is maximum at the moment of maximum work resistance.

A still further object is to provide a durable mechanism of the type indicated which can be expeditiously and economically manufactured.

Still another object is to provide an improved portable grass or hedge shear or the like, having the mechanical movement of the invention incorporated therein for operating the shear.

A further object of the invention is to provide a grass shear or the like having a toggle mechanical movement for operating the shear blades and which is actuated by means of a rotating crank whereby two cutting operations or movements of the blades are obtained for each single rotation of the crank.

A mechanical movement embodying the invention has been applied to use in the making of grass or hedge shears or the like; and, for the purposes of disclosure of the principles of the invention, such an embodiment will be more particularly described, but it is to be understood that the description of the particular embodiment is illustrative merely and is not intended as defining the limits of the invention.

Additional objects and advantages of the invention will be readily apparent from the reading of the following description of a device constructed in accordance with the invention, and reference to the accompanying drawings thereof, wherein:

Figure 1 is a side view of a grass cutter having an operating mechanism embodying the mechanical movement of the invention incorporated therein and showing the shear blades in separated or open position,

2

Figure 2 is a similar view showing the mechanism and the blades in the overlapping relation assumed after the cutting operation, Figure 3 is a perspective view of another embodiment of the invention wherein the actuating force is applied by a rotating crank and in which the blades are brought together twice for cutting during each complete rotation of the crank, and Figure 4 is a view similar to Figure 3 but showing the toggle mechanism after the same has moved through one half turn of the crank.

Referring more particularly to the drawings, in the embodiment shown in Figures 1 and 2, a grass cutter is illustrated having a pair of overlapping shear blades or knives 11 and 12 carried at the lower end of a rod 13 as a support. The rod has a convenient handle 14 at its upper end and the device is so balanced as to be easily carried by the handle. The shear blades 11 and 12 are suitably connected to the rod 13 by a connector or hub 15 to permit pivotal movement relative to each other for shearing operation, and they are formed with rearwardly extending arms 16 and 17 having upturned ears 18 and 19 to which a toggle actuating mechanism is connected. A tension spring 20 has its ends connected to the upturned ears at the rear of the arms, and the spring biases the shear blades toward separated or open position.

The toggle mechanism for actuating the shear blades comprises the functionally similar toggle links 24 and 25. Link 24 is connected to the ear 18 of the arm 16 by a pivot pin 26 and the other link 25 is connected to the ear 19 of the arm 17 by a pivot pin 27.

The other ends of the links 24 and 25 are pivotally connected to each other and to a clevis link 30 by a pin or bolt 31. It will be noted that the links 24 and 25, which are angular in shape to provide ends lying in suitable planes at an angle to each other, should be slightly differently shaped to allow for the effect of the thickness of the links at their overlapping ends. Lines extending through the longitudinal axes of the pivot pins 26 and 27 and of the clevis bolt 31 meet to intersect each other at a point on the line of the axis of the pivotal connection between the two shear blades, and preferably at a point intermediate the blades.

The described arrangement wherein the center lines or axes of the several pivotal connections meet causes effective operation free from any binding of the links. The reason for this is that each pivotal connection moves in what may be considered an imaginary spherical surface. If the distance from the point of intersection of the several axes to the several pivotal connections of the toggle links and the arms is the same, then, all the pivotal connections will move in the same imaginary spherical surface and about the center of the sphere as a center. It follows that, in every position of the links during operation, the pivotal connections will be maintained without a twisting of the links that will cause binding. It will be noted that the requirement that the pivot axes shall be positioned as above-indicated determines the angular shape of the toggle links necessary to make the end portions lie in planes at a right angle to the pivot axis in each case. Upon further consideration of the structure, it will also be clear that, if the axes of the pivots meet as indicated, even if the radial distances of the joints from the point of intersection of the axes differ, the conditions for smooth operation without binding are nevertheless maintained.

In order to operate the toggle mechanism to actuate the shear blades, force is preferably applied to the joint between the two toggle links. As shown, an actuating lever 35 is pivoted on the handle 14, the handle and lever being so formed that they can be gripped by one hand to apply operating force to the lever. The operating lever and the clevis link 30 are connected by a rod 36 pivoted at its upper end to the operating lever and at its lower end to the clevis link 30. A spring 37 biases the lever 35 toward the position in which the shear blades are separated, and after the cutting operation, it co-acts with the spring 26 on the blades to open the blades and return the lever to that position, shown in Figure 1. The range of movement of the operating lever is such as to move the shear blades from fully separated position to overlapping cutting position. As the shear blades move toward each other under the force of the toggle mechanism, the power factor of the toggle increases until it is maximum substantially at the point of maximum cutting resistance.

It is to be noted that, as shown, the shearing blades operate in what may be described for convenience as a substantially horizontal plane, and the toggle linkage operates in a substantially vertical plane. It will be noted also that the angle between the plane of the shear blades and their actuating arms in this particular case is considerable and may be described as approximating a right angle. Furthermore, the planes in which the toggle links move are also generally vertical to the plane of the cutting blades. Thus, the force applied to the blades by means of the toggle link mechanism is also generally vertical to the plane of movement of the cutter blades.

Another embodiment of the invention, which operates somewhat differently, is shown in Figures 3 and 4. This device is designed for operation with two hands, power being applied by a hand operated rotary element or crank. While the device is supported in one hand the rotary element is actuated by the other hand.

As shown, shear blades 40 and 41 are carried at the lower end of a rod 42 as a support. The rod has a convenient handle 43 at its upper end on which an operating crank disk 44 is rotatably mounted. The blades 40 and 41 are suitably connected to the rod 42 by a hub or connector 45 carried at the lower end of the rod, and such mounting permits pivotal movement of the blades relative to each other for shearing operation. The blades are formed with rearwardly extending arms 46 and 47 having upturned ears 48 and 49 to which a toggle actuating mechanism is connected. The arms may be connected at their ends by a tension spring 50 which biases the shear blades toward separated position; or the spring may be omitted, if desired.

The toggle mechanism for actuating the shear blades comprises the toggle link 54 connected to the arm 46 by a pivot pin 55 and the toggle link 56 connected to the arm 47 by a pivot pin 57. The other ends of the links are pivotally connected to each other and to a clevis link 60 by a bolt 61. The toggle links 54 and 55 are angular in shape to provide end portions lying in suitable planes at a right angle to the pivot axes thereof, in the same manner as the toggle links of the form first described. The two links may be slightly different in shape to allow for the effect of the thickness of the links at their overlapping ends. Lines extending through the axes of the pivot pins 56 and 57 and the clevis bolt 61 will meet to intersect each other at a point on the line of the axis of the pivotal connection between the two shear knives or blades, and preferably at a point intermediate such blades.

Power is applied to operate the toggle mechanism by a hand crank comprising the hand grip 65 rotatably secured to the disk 44 and serving as a connection for one end of an elongate connecting rod or link 66, which at its other end is connected to the clevis link 60. The connecting rod is of such a length that during each rotation of the crank the shears are closed twice in cutting action. When the crank is in the position shown in Figure 3, with the link in its extreme retracted position, the toggle is held in its closed or folded position holding the blades separated. As the crank is turned through 90 degrees, the toggle links are straightened to cause cutting action of the blades; and, as the crank continues in its rotation to the 180-degree position the toggle is again closed or folded and the blades moved to open position. During the remainder of the rotation of the crank to its starting position the toggle is again straightened to cause cutting action and again closed or folded to return the blades to open position.

In this embodiment of the invention, as in that shown in Figures 1 and 2, the toggle mechanism operates smoothly and without binding, due to the fact that the center lines or axes of the pivots all meet at a common point, and the pivots in effect travel along a spherical surface.

The construction of each of the pivots of the toggle mechanism is such that all movement is in a plane at a right angle to the axis of the pivot, in other words the connection partakes generally of the nature of a hinge and for convenience of description in the claims the joint may be referred to as a hinge-like pivot.

From the foregoing, it will be seen that an improved toggle type mechanical movement has been provided, wherein the actuating force is applied at an angle to the plane of movement of the parts to be operated by the toggle mechanism; and, wherein the pivotal connections of the various links of the mechanism are so arranged that there is no binding of the moving parts during operation. It will further be seen that the mechanism is simple in form and may be expeditiously and economically manufactured.

In addition, the mechanical movement is particularly adapted and suitable for application to an improved hedge or grass shear or the like for operating the cutting blades thereof; such construction providing for an increase in the force applied to actuation of the blades as the work resistance increases, such applied force being maximum at the moment of maximum work resistance.

Furthermore, the mechanism is particularly adapted for actuation of a shear of the character described by means of a rotating crank, whereby two cutting operations or movements of the blades are obtained for each single rotation of the crank.

The foregoing description of the invention is explanatory only, and changes in the details of the constructions illustrated may be made by those skilled in the art, within the scope of the appended claims, without departing from the spirit of the invention.

What I claim and desire to secure by Letters Patent is:

1. A mechanical movement including: a support, a pair of arms pivoted to said support to swing about a common pivotal axis, a pair of toggle links pivoted to each other with the free end of each pivoted to one of the arms, the pivots connecting the toggle links to each other and to the arms being positioned so that the three axes of the pivots of the toggle links meet at a common point on said common pivotal axis about which the arms pivot.

2. A mechanical movement including: a support, a pair of arms carried by said support and pivotally connected to swing in substantially a given plane toward and from each other about a common axis, and a toggle mechanism positioned at an angle to the plane of movement of the arms and connected to said arms to swing the arms toward and from each other and comprising a pair of toggle links pivoted to each other with the free end of each pivoted to one of the pair of arms and wherein the pivots connecting the toggle links to each other and to the arms are so positioned that the three axes of the pivots of the toggle links meet at a common point on the axis about which the arms pivot.

3. In a mechanical movement, a toggle mechanism comprising a pair of pivotally connected arms, a pair of toggle links pivotally connected to each other and pivotally connected to said arms, each pivotal connection operating about an axis and being so disposed that all of the axes meet at a common point.

4. In a mechanical movement, a support, a pair of arms carried by said support and movable about a common axis toward and from each other in a plane, and a toggle mechanism operating in a plane at an angle to the plane of movement of the arms and connected to the arms to move them toward and from each other and including toggle links with pivotal connections between the toggle links and between the respective toggle links and the arms, the pivotal connections being so positioned that the lines of the several axes of the pivotal connections meet at a point on said common axis about which the arms move.

5. In a mechanical movement, a support, a pair of arms carried by said support and movable about a common axis toward and from each other in a plane, and a toggle mechanism operating in a plane at substantially a right angle to the plane of movement of the arms and connected to the arms to move them toward and from each other and including toggle links with pivotal connections between the toggle links and between the respective toggle links and the arms, the pivotal connections between the links and between the links and the arms are so disposed that the lines of the several axes of the pivotal connections meet at a point on said common axis about which the arms move.

6. In a mechanical movement, a pair of arms pivoted to swing about a common axis relatively to each other in a given plane, a toggle mechanism positioned at an angle to said given plane and connected to said arms to move them relatively toward and from each other, said toggle mechanism comprising a pair of links pivoted to each other at one end and each pivoted at its opposite free end to one of said arms, the pivotal connections between the links and between the links and arms being so disposed that the lines of the axes of the three pivots and the line of the common axis about which the arms swing meet at a common point, and means connected with the pivot between the pair of toggle links for applying force to the toggle links to move the arms toward and from each other.

7. A toggle mechanism including: a hub, a pair of movable members carried by the hub and swingable thereon about the axis of the hub in overlapping relationship with each other, rearwardly projecting arms on the movable members having connecting members at their outer ends, a pair of toggle links each having one end pivotally connected to the other link and its other end pivotally connected to one of the connecting members of the arms, the pivots connecting the links to each other and to the connecting members of the arms being so disposed that the axes of the several pivots converge and intersect at a common point in the axis of the hub, and an operating rod connected with the common pivot between the toggle links for moving said links to swing the movable members.

ALEXANDER B. HULSE.

References Cited in the file of this patent

UNITED STATES PATENTS

| Number | Name | Date |
| --- | --- | --- |
| 1,175,683 | Beach | Mar. 14, 1916 |
| 1,199,134 | Walters | Sept. 26, 1916 |
| 1,592,198 | Gladysz | July 13, 1926 |
| 1,823,199 | Huxman | Sept. 15, 1931 |
| 2,469,983 | Newbold | May 10, 1949 |
| 2,497,211 | De Carlo | Feb. 14, 1950 |